US012556868B2

(12) United States Patent
Xiao et al.

(10) Patent No.: US 12,556,868 B2
(45) Date of Patent: Feb. 17, 2026

(54) SPEAKER

(71) Applicant: AAC Microtech (Changzhou) Co., Ltd., Jiangsu (CN)

(72) Inventors: Bo Xiao, Changzhou (CN); Ronglin Linghu, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 516 days.

(21) Appl. No.: 18/313,349

(22) Filed: May 7, 2023

(65) Prior Publication Data

US 2024/0244378 A1 Jul. 18, 2024

Related U.S. Application Data

(63) Continuation of application No. PCT/CN2023/085165, filed on Mar. 30, 2023.

(30) Foreign Application Priority Data

Jan. 16, 2023 (CN) ......................... 202320138515.2

(51) Int. Cl.

| | |
|---|---|
| ***H04R 9/06*** | (2006.01) |
| ***H04R 3/00*** | (2006.01) |
| ***H04R 7/06*** | (2006.01) |
| ***H04R 7/18*** | (2006.01) |
| ***H04R 9/02*** | (2006.01) |

(52) U.S. Cl.

CPC ................. *H04R 9/06* (2013.01); *H04R 3/00* (2013.01); *H04R 7/06* (2013.01); *H04R 7/18* (2013.01); *H04R 9/025* (2013.01); *H04R 2307/023* (2013.01); *H04R 2400/11* (2013.01)

(58) Field of Classification Search

CPC ... H04R 9/06; H04R 3/00; H04R 7/06; H04R 7/18; H04R 9/025; H04R 2307/023; H04R 2400/11; H04R 1/34

See application file for complete search history.

(56) References Cited

U.S. PATENT DOCUMENTS

| | | | | |
|---|---|---|---|---|
| 11,638,097 B1 * | 4/2023 | Jin | ........................... | H04R 7/20 381/412 |
| 2022/0174411 A1 * | 6/2022 | Song | ........................ | H04R 7/04 |
| 2024/0244377 A1 * | 7/2024 | Xiao | ...................... | H04R 9/046 |

* cited by examiner

*Primary Examiner* — Vivian C Chin
*Assistant Examiner* — Annabelle Kang
(74) *Attorney, Agent, or Firm* — Wiersch Law Group

(57) ABSTRACT

Disclosed is a speaker which improves acoustic performances and includes a frame, a vibration system, a magnetic circuit system, a front cover, a sealing diaphragm, and a sound outlet. The vibration system includes an upper diaphragm, a lower diaphragm in an annular shape, a skeleton including an annular enclosure wall, and a voice coil. The magnetic circuit system includes a bottom plate, a first magnetic unit, and a second magnetic unit. The upper diaphragm includes an inner suspension fixed to the first magnetic unit, an outer suspension fixed to the frame, and a dome. The upper diaphragm and the front cover form a first front cavity. The annular enclosure wall, the sealing diaphragm, the lower diaphragm and the frame form a second front cavity. Both the first front cavity and the second front cavity communicate with the sound outlet.

10 Claims, 3 Drawing Sheets

A-A

SPEAKER

FIELD OF THE PRESENT DISCLOSURE

The present disclosure relates to electroacoustic transducers, in particular to a speaker.

DESCRIPTION OF THE RELATED ART

A speaker generates sounds through a magnetic circuit system driving a diaphragm of a vibration system to vibrate for repeatedly pushing air. The diaphragm as a core component of the speaker directly affects acoustic performances of the speaker.

In particular, an effective vibration area of the diaphragm (Sd) is one important factor affecting acoustic performances of the speaker. The larger the effective vibration area of the diaphragm is, the better acoustic performances of the speaker are. However, the effective vibration area of the diaphragm of a speaker in the related art is small, resulting in acoustic performances of the speaker being affected.

Thus, it is necessary to provide a novel speaker to solve the problem.

SUMMARY

An objective of the present disclosure is to overcome the above technical problem and provide a speaker of which the effective vibration area of the diaphragm increases.

In order to achieve the objective mentioned above, the present disclosure discloses a speaker including a frame, a vibration system fixed to the frame, a magnetic circuit system fixed to the frame, a front cover disposed on the frame, a sealing diaphragm, and a sound outlet formed on a side of the speaker. The magnetic circuit system includes a bottom plate, a first magnetic unit disposed on the bottom plate, and a second magnetic unit disposed on the bottom plate and spaced apart from the first magnetic unit for forming a magnetic gap. The vibration system includes an upper diaphragm, a lower diaphragm in an annular shape and spaced apart from the upper diaphragm, a skeleton connected between the upper diaphragm and the lower diaphragm, and a voice coil fixed to the skeleton and located in the magnetic gap. The upper diaphragm includes an inner suspension fixed to the first magnetic unit, an outer suspension surrounding the inner suspension and fixed to the frame, and a dome connected between the inner suspension and the outer suspension. The skeleton includes a fixing part fixed to the dome and an annular enclosure wall extending in a direction close to the lower diaphragm from an outer edge of the fixing part and arranged between the frame and the magnetic circuit system. The lower diaphragm is connected between the frame and the annular enclosure wall. The sealing diaphragm is connected between the frame and the annular enclosure wall. The upper diaphragm and the front cover form a first front cavity. The annular enclosure wall, the sealing diaphragm, the lower diaphragm and the frame form a second front cavity. Both the first front cavity and the second front cavity communicate with the sound outlet.

As an improvement, a Young's modulus of the sealing diaphragm is 0.5 Mpa to 10 Mpa.

As an improvement, the sealing diaphragm is a silicon diaphragm.

As an improvement, the sealing diaphragm and the annular enclosure wall are integrally formed by hot pressing.

As an improvement, the sealing diaphragm is glued to the annular enclosure wall.

As an improvement, the skeleton further includes an extension part extending in a direction away from the upper diaphragm from an inner edge of the fixing part. The voice coil is fixed to the extension part.

As an improvement, the first magnetic unit includes a first magnet disposed on the bottom plate, a first yoke disposed on the first magnet, and a second magnet disposed on the first yoke. The second magnetic unit includes a third magnet disposed on the bottom plate and a second yoke disposed on the third magnet. The inner suspension is fixed to the second magnet.

As an improvement, the first magnet, the second magnet and the third magnet are magnetized along a vibration direction of the voice coil. Magnetization directions of the first magnet and the second magnet are opposite. Magnetization directions of the first magnet and the third magnet are opposite.

As an improvement, the bottom plate includes a main body part and a plurality of supporting arms extending outward from the main body part and fixed to the frame. The first magnetic unit and the second magnetic unit are disposed on the main body part.

As an improvement, the speaker further includes a flexible printed circuit board. The flexible printed circuit board is connected between the frame and the annular enclosure wall and fixed to a side of the lower diaphragm close to the upper diaphragm. The voice coil is electrically connected to an external circuit through the flexible printed circuit board.

In the speaker according to the present disclosure, the upper diaphragm and the lower diaphragm vibrate in the same phrase. The upper diaphragm and the front cover form the first front cavity. The annular enclosure wall, the sealing diaphragm, the lower diaphragm and the frame form the second front cavity. Both the first front cavity and the second front cavity communicate with the sound outlet. Thus, the effective vibration area of the diaphragm of the speaker is a sum of the effective vibration area of the upper diaphragm and the effective vibration area of the lower diaphragm, so the effective vibration area of the diaphragm of the speaker increases for improving acoustic performances of the speaker.

BRIEF DESCRIPTION OF THE DRAWINGS

In order to more clearly illustrate the technical solutions in embodiments of the present disclosure, the accompanying drawings used in the description of the embodiments will be briefly introduced below. It is apparent that, the accompanying drawings in the following description are only some embodiments of the present disclosure, and other drawings can be obtained by those of ordinary skill in the art based on the accompanying drawings without creative efforts, wherein.

DETAILED DESCRIPTION OF THE EMBODIMENTS

The technical solutions in embodiments of the present disclosure will be described clearly and completely below with reference to the accompanying drawings in the embodiments of the present disclosure. It is apparent that, the described embodiments are merely some of rather than all of the embodiments of the present disclosure. All other embodiments acquired by those of ordinary skill in the art without creative efforts based on the embodiments of the present disclosure shall fall within the protection scope of the present disclosure.

Figure 1:
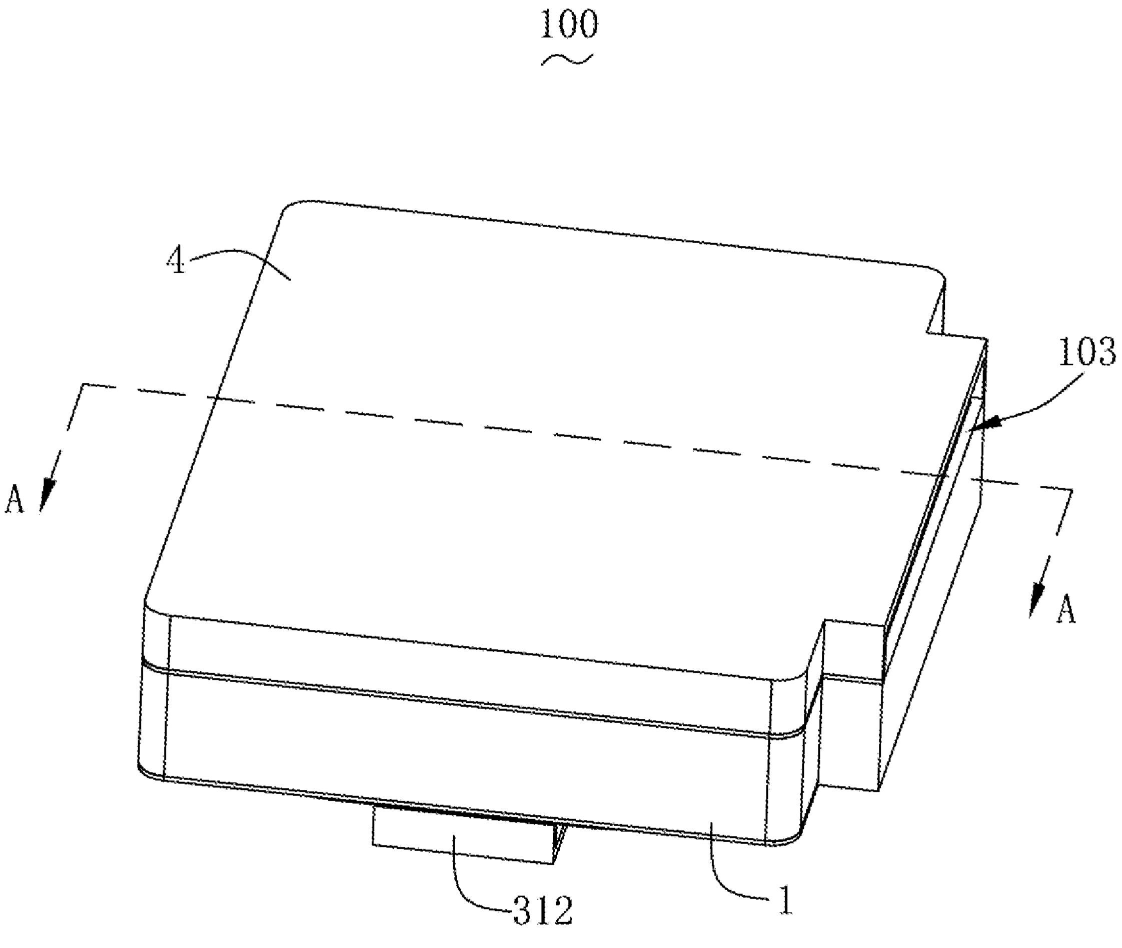
FIG. 1 is an isometric view of a speaker in accordance with an exemplary embodiment of the present disclosure.
Figure 2:
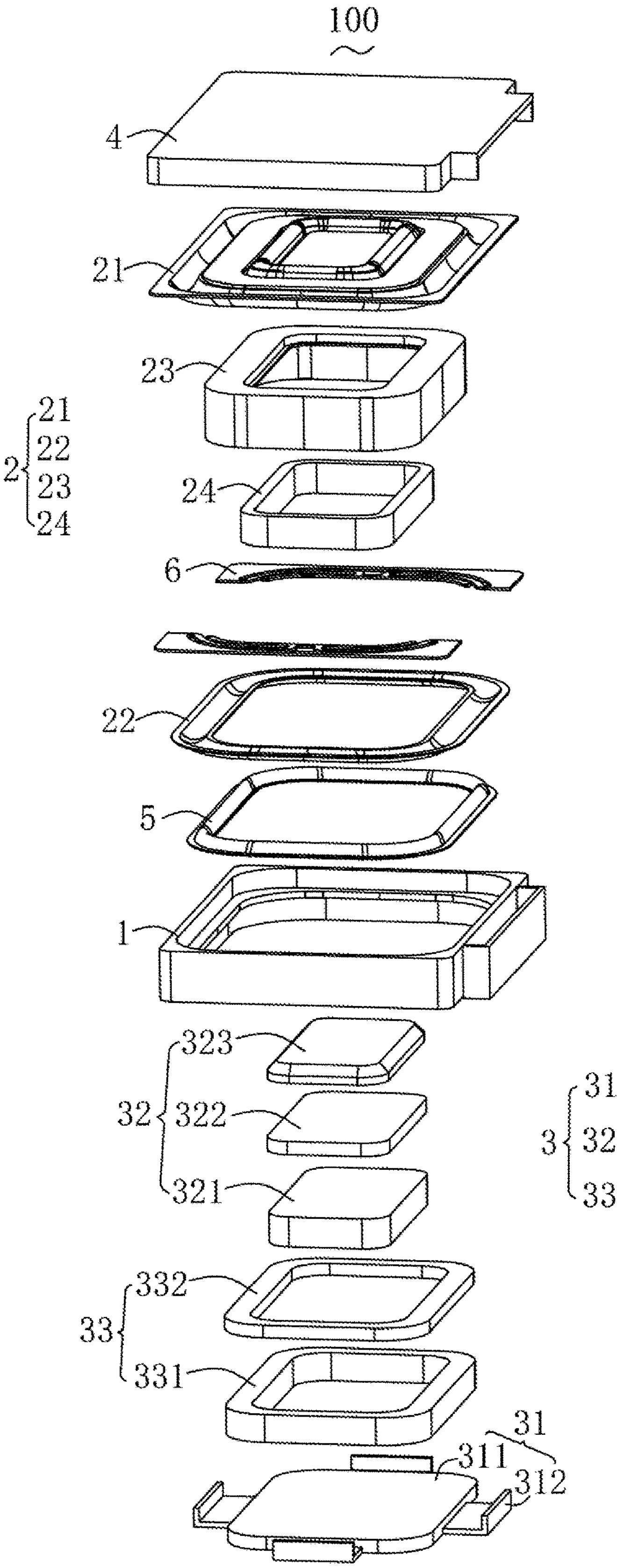
FIG. 2 is an exploded view of the speaker in FIG. 1.
Figure 3:
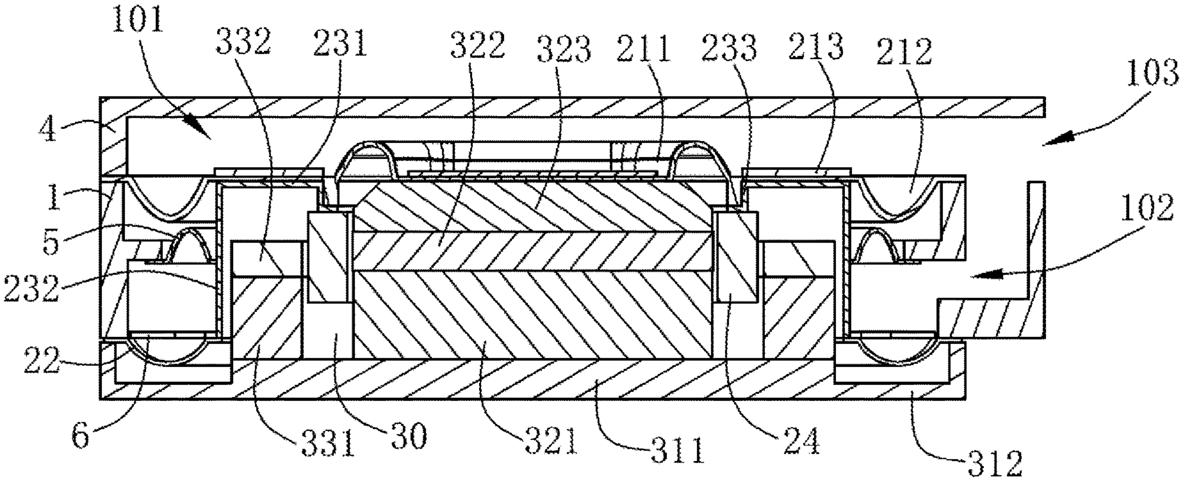
FIG. 3 is a cross-sectional view of the speaker, taken along line A-A in FIG. 1.

Referring to FIGS. 1-3, the present disclosure discloses a speaker 100 including a frame 1, a vibration system 2 fixed to the frame 1, a magnetic circuit system 3 fixed to the frame 1, and a front cover 4 disposed on the frame 1.

The vibration system 2 includes an upper diaphragm 21, a lower diaphragm 22 in an annular shape and spaced apart from the upper diaphragm 21, a skeleton 23 connected between the upper diaphragm 21 and the lower diaphragm 22, and a voice coil 24 fixed to the skeleton 23.

The magnetic circuit system 3 includes a bottom plate 31, a first magnetic unit 32 disposed on the bottom plate 31, and a second magnetic unit 33 disposed on the bottom plate 31 and spaced apart from the first magnetic unit 32 for forming a magnetic gap 30. The voice coil 24 locates in the magnetic gap 30. The bottom plate 31 includes a main body part 311 and a plurality of supporting arms 312 extending outward from the main body part 311 and fixed to the frame 1. The first magnetic unit 32 and the second magnetic unit 33 are disposed on the main body part 311.

The upper diaphragm 21 includes an inner suspension 211 fixed to the first magnetic unit 32, an outer suspension 212 surrounding the inner suspension 211 and fixed to the frame 1, and a dome 213 connected between the inner suspension 211 and the outer suspension 212.

Optionally, the first magnetic unit 32 includes a first magnet 321 disposed on the bottom plate 31, a first yoke 322 disposed on the first magnet 321, and a second magnet 323 disposed on the first yoke 322. The second magnetic unit 33 includes a third magnet 331 disposed on the bottom plate 31 and a second yoke 332 disposed on the third magnet 331. The inner suspension 211 is fixed to the second magnet 323.

The first magnet 321, the second magnet 323 and the third magnet 331 are magnetized along a vibration direction of the voice coil 24. Magnetization directions of the first magnet 321 and the second magnet 323 are opposite. Magnetization directions of the first magnet 321 and the third magnet 331 are opposite.

The skeleton 23 includes a fixing part 231 fixed to the dome 213 and an annular enclosure wall 232 extending in a direction close to the lower diaphragm 22 from an outer edge of the fixing part 231. The annular enclosure wall 232 is arranged between the frame 1 and the magnetic circuit system 3. The lower diaphragm 22 is connected between the frame 1 and the annular enclosure wall 232.

The speaker 100 further includes a sealing diaphragm 5 connected between the frame 1 and the annular enclosure wall 232. The upper diaphragm 21 and the front cover 4 form a first front cavity 101. The annular enclosure wall 232, the sealing diaphragm 5, the lower diaphragm 22 and the frame 1 form a second front cavity 102. The speaker 100 further includes a sound outlet 103 formed on a side thereof. Both the first front cavity 101 and the second front cavity 102 communicate with the sound outlet 103.

A Young's modulus of the sealing diaphragm 5 is 0.5 Mpa to 10 Mpa. Optionally, the sealing diaphragm 5 can be a silicon diaphragm, a silicone rubber diaphragm or another polymer material diaphragm.

Optionally, the sealing diaphragm 5 and the annular enclosure wall 232 can be integrally formed by hot pressing, or the sealing diaphragm 5 can be glued to the annular enclosure wall 232.

The skeleton 23 further includes an extension part 233 extending in a direction away from the upper diaphragm 21 from an inner edge of the fixing part 231. The voice coil 24 is fixed to the extension part 233. The extension part 233 can adjust a position of the voice coil 24 in the magnetic gap 30.

The speaker 100 further includes a flexible printed circuit board 6. The flexible printed circuit board 6 is connected between the frame 1 and the annular enclosure wall 232 and fixed to a side of the lower diaphragm 22 close to the upper diaphragm 21. The voice coil 24 is electrically connected to an external circuit through the flexible printed circuit board 6.

In the speaker 100 according to the present disclosure, the upper diaphragm 21 and the lower diaphragm 22 vibrate in the same phrase. The upper diaphragm 21 and the front cover 4 form the first front cavity 101. The annular enclosure wall 232, the sealing diaphragm 5, the lower diaphragm 22 and the frame 1 form the second front cavity 102. Both the first front cavity 101 and the second front cavity 102 communicate with the sound outlet 103. Thus, the effective vibration area of the diaphragm of the speaker 100 is a sum of the effective vibration area of the upper diaphragm 21 and the effective vibration area of the lower diaphragm 22, so the effective vibration area of the diaphragm of the speaker 100 increases for improving acoustic performances of the speaker 100.

The above are only embodiments of the present disclosure. It should be pointed out that those of ordinary skill in the art may also make improvements without departing from the ideas of the present disclosure, all of which fall within the protection scope of the present disclosure.

What is claimed is:

1. A speaker, comprising:

a frame;

a vibration system fixed to the frame;

a magnetic circuit system fixed to the frame;

a front cover disposed on the frame;

a sealing diaphragm; and a sound outlet formed on a side of the speaker, wherein the magnetic circuit system comprises a bottom plate, a first magnetic unit disposed on the bottom plate, and a second magnetic unit disposed on the bottom plate and spaced apart from the first magnetic unit for forming a magnetic gap; the vibration system comprises an upper diaphragm, a lower diaphragm in an annular shape and spaced apart from the upper diaphragm, a skeleton connected between the upper diaphragm and the lower diaphragm, and a voice coil fixed to the skeleton and located in the magnetic gap; the upper diaphragm comprises an inner suspension fixed to the first magnetic unit, an outer suspension surrounding the inner suspension and fixed to the frame, and a dome connected between the inner suspension and the outer suspension; the skeleton comprises a fixing part fixed to the dome and an annular enclosure wall extending in a direction close to the lower diaphragm from an outer edge of the fixing part and arranged between the frame and the magnetic circuit system; the lower diaphragm is connected between the frame and the annular enclosure wall; the sealing diaphragm is connected between the frame and the annular enclosure wall; the upper diaphragm and the front cover form a first front cavity; the annular enclosure wall, the sealing diaphragm, the lower diaphragm and the frame form a second front cavity; both the first front cavity and the second front cavity communicate with the sound outlet.

2. The speaker as described in claim 1, wherein a Young's modulus of the sealing diaphragm is 0.5 Mpa to 10 Mpa.

3. The speaker as described in claim 2, wherein the sealing diaphragm is a silicon diaphragm.

4. The speaker as described in claim 1, wherein the sealing diaphragm and the annular enclosure wall are integrally formed by hot pressing.

5. The speaker as described in claim 1, wherein the sealing diaphragm is glued to the annular enclosure wall.

6. The speaker as described in claim 1, wherein the skeleton further comprises an extension part extending in a direction away from the upper diaphragm from an inner edge of the fixing part, the voice coil is fixed to the extension part.

7. The speaker as described in claim 1, wherein the first magnetic unit comprises a first magnet disposed on the bottom plate, a first yoke disposed on the first magnet, and a second magnet disposed on the first yoke, the second magnetic unit comprises a third magnet disposed on the bottom plate and a second yoke disposed on the third magnet, the inner suspension is fixed to the second magnet.

8. The speaker as described in claim 7, wherein the first magnet, the second magnet and the third magnet are magnetized along a vibration direction of the voice coil, magnetization directions of the first magnet and the second magnet are opposite, magnetization directions of the first magnet and the third magnet are opposite.

9. The speaker as described in claim 1, wherein the bottom plate comprises a main body part and a plurality of supporting arms extending outward from the main body part and fixed to the frame, the first magnetic unit and the second magnetic unit are disposed on the main body part.

10. The speaker as described in claim 1, further comprising a flexible printed circuit board, wherein the flexible printed circuit board is connected between the frame and the annular enclosure wall and fixed to a side of the lower diaphragm close to the upper diaphragm, the voice coil is electrically connected to an external circuit through the flexible printed circuit board.

* * * * *